United States Patent
Eisner et al.

(10) Patent No.: US 9,542,391 B1
(45) Date of Patent: Jan. 10, 2017

(54) PROCESSING SERVICE REQUESTS FOR NON-TRANSACTIONAL DATABASES

(71) Applicant: Amazon Technologies, Inc., Seattle, WA (US)

(72) Inventors: Noah Anthony Eisner, Menlo Park, CA (US); Kevin Gillett, Seattle, WA (US); Himanshu Khurana, Seattle, WA (US); Arun Ponniah Sethuramalingam, San Jose, CA (US); Nagesh Pradhan Cadabam, Sunnyvale, CA (US); Liangliang Wang, Foster City, CA (US); Sharad Kala, Sunnyvale, CA (US); Stephen Joseph Oakley, Mountain View, CA (US); Nandhini Nandiwada Santhanam, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 14/077,209

(22) Filed: Nov. 11, 2013

(51) Int. Cl.
  *G06F 17/00* (2006.01)
  *G06F 7/00* (2006.01)
  *G06F 17/30* (2006.01)

(52) U.S. Cl.
  CPC ... *G06F 17/30011* (2013.01); *G06F 17/30578* (2013.01)

(58) Field of Classification Search
  CPC ............ G06F 17/30011; G06F 17/30578
  USPC ............................................. 707/608
  See application file for complete search history.

(56) References Cited

U.S. PATENT DOCUMENTS

| | | | | |
|---|---|---|---|---|
| 5,251,315 A | * | 10/1993 | Wang | G06F 17/2288 707/999.008 |
| 5,577,188 A | | 11/1996 | Zhu | |
| 6,687,878 B1 | | 2/2004 | Eintracht et al. | |
| 6,725,239 B2 | * | 4/2004 | Sherman | G06F 17/30578 707/999.001 |
| 6,763,346 B1 | * | 7/2004 | Nishida | G06F 17/30011 707/802 |
| 7,177,886 B2 | * | 2/2007 | Pruet, III | G06F 17/30578 707/999.202 |
| 7,882,110 B2 | * | 2/2011 | Bahr | G06F 17/30011 707/741 |
| 8,429,753 B2 | * | 4/2013 | Skaria | G06F 21/6218 709/225 |
| 8,527,461 B2 | * | 9/2013 | Ducott, III | G06F 17/30578 707/635 |

(Continued)

OTHER PUBLICATIONS

International Search Report and Written Opinion mailed Mar. 31, 2015, in International Patent Application No. PCT/US2014/64875, filed Nov. 10, 2014.

(Continued)

*Primary Examiner* — Pavan Mamillapalli
(74) *Attorney, Agent, or Firm* — Davis Wright Tremaine LLP

(57) ABSTRACT

A method and apparatus for processing service requests for non-transactional databases are disclosed. In the method and apparatus, the execution of a first operation may be initiated based at least in part on receiving a service request from a user. The first operation may be executed synchronously with receipt of the request. Further, one or more execution workflows may be provisioned for asynchronous execution of one or more other operations.

20 Claims, 8 Drawing Sheets

(56) References Cited

U.S. PATENT DOCUMENTS

| | | | |
|---|---|---|---|
| 8,825,502 B2* | 9/2014 | Bormann | G06F 17/30578 705/2 |
| 9,020,893 B2* | 4/2015 | Zalpuri | G06F 17/30174 707/636 |
| 2004/0210833 A1 | 10/2004 | Lerner et al. | |
| 2005/0034062 A1 | 2/2005 | Bufkin et al. | |
| 2005/0038787 A1 | 2/2005 | Cheung et al. | |
| 2005/0044494 A1 | 2/2005 | Barnes et al. | |
| 2005/0055306 A1 | 3/2005 | Miller et al. | |
| 2005/0160356 A1 | 7/2005 | Albornoz et al. | |
| 2007/0118795 A1 | 5/2007 | Noyes et al. | |
| 2007/0271249 A1 | 11/2007 | Cragun et al. | |
| 2008/0222512 A1 | 9/2008 | Albornoz et al. | |
| 2009/0260060 A1* | 10/2009 | Smith | H04L 63/105 726/3 |
| 2010/0095203 A1 | 4/2010 | Toebes et al. | |
| 2010/0174983 A1 | 7/2010 | Levy et al. | |
| 2010/0211781 A1 | 8/2010 | Auradkar et al. | |
| 2010/0241668 A1 | 9/2010 | Susanto et al. | |
| 2010/0318893 A1 | 12/2010 | Matthews et al. | |
| 2010/0325686 A1 | 12/2010 | Davis et al. | |
| 2011/0078615 A1 | 3/2011 | Bier | |
| 2011/0099152 A1 | 4/2011 | Law et al. | |
| 2011/0145593 A1 | 6/2011 | Auradkar et al. | |
| 2011/0178981 A1 | 7/2011 | Bowen et al. | |
| 2011/0302210 A1 | 12/2011 | Comanescu | |
| 2012/0030553 A1 | 2/2012 | Delpha et al. | |
| 2012/0222132 A1 | 8/2012 | Burger et al. | |
| 2012/0284605 A1 | 11/2012 | Sitrick et al. | |
| 2012/0323968 A1 | 12/2012 | Yih et al. | |
| 2013/0151970 A1 | 6/2013 | Achour | |
| 2014/0026025 A1 | 1/2014 | Smith | |
| 2014/0250073 A1* | 9/2014 | Zalpuri | G06F 17/30174 707/636 |

OTHER PUBLICATIONS

Eppstein et al., "What's the Difference? Efficient Set Reconciliation Without Prior Context?", SIGCOMM '11, Toronto Ontario, Canada, Aug. 15-19, 2011, 12 pages.

International Search Report and Written Opinion mailed Aug. 28, 2015, International Patent Application No. PCT/US2015/014911, filed Feb. 6, 2015.

* cited by examiner

PROCESSING SERVICE REQUESTS FOR NON-TRANSACTIONAL DATABASES

CROSS-REFERENCE TO RELATED APPLICATIONS

This application incorporates by reference for all purposes the full disclosure of co-pending U.S. patent application Ser. No. 14/077,195, filed concurrently herewith, entitled "HOMOGENOUS CAPTURE OF DOCUMENT INTERACTIONS," co-pending U.S. patent application Ser. No. 14/077,204, filed concurrently herewith, entitled "DOCUMENT MANAGEMENT AND COLLABORATION SYSTEM," co-pending U.S. patent application Ser. No. 14/077,201, filed concurrently herewith, entitled "CROSS-PLATFORM HOMOGENOUS DOCUMENT COLLABORATION," and co-pending U.S. patent application Ser. No. 14/077,210, filed concurrently herewith, entitled "DOCUMENT VERSION CONTROL IN COLLABORATIVE ENVIRONMENT."

BACKGROUND

The use of remote computing services, such as remote document storage, has greatly increased in recent years. An organization, for example, may support its operations using both internal networks of computing resources and computing resources managed by others. Computers of the organization, for instance, may communicate with computers of other organizations to access and/or provide documents or other data while using services of another organization. In many instances, organizations configure and operate remote networks using hardware managed by other organizations, thereby reducing infrastructure costs and achieving other advantages. With such configurations of computing resources, ensuring that access to the resources and the data they hold can be challenging, especially given the multitude of different computing systems. For example, computers of the organization may include personal computers, tablets, smartphones, laptops and other devices.

Ensuring that users can share and collaborate on documents is challenging given the variety of hardware and software components of different devices. Furthermore, it is challenging to ensure that user requests are timely processed and that back-end systems are updated in a manner that ensures overall system consistency.

BRIEF DESCRIPTION OF THE DRAWINGS

Various embodiments in accordance with the present disclosure will be described with reference to the drawings, in which.

DETAILED DESCRIPTION

Figure 1:
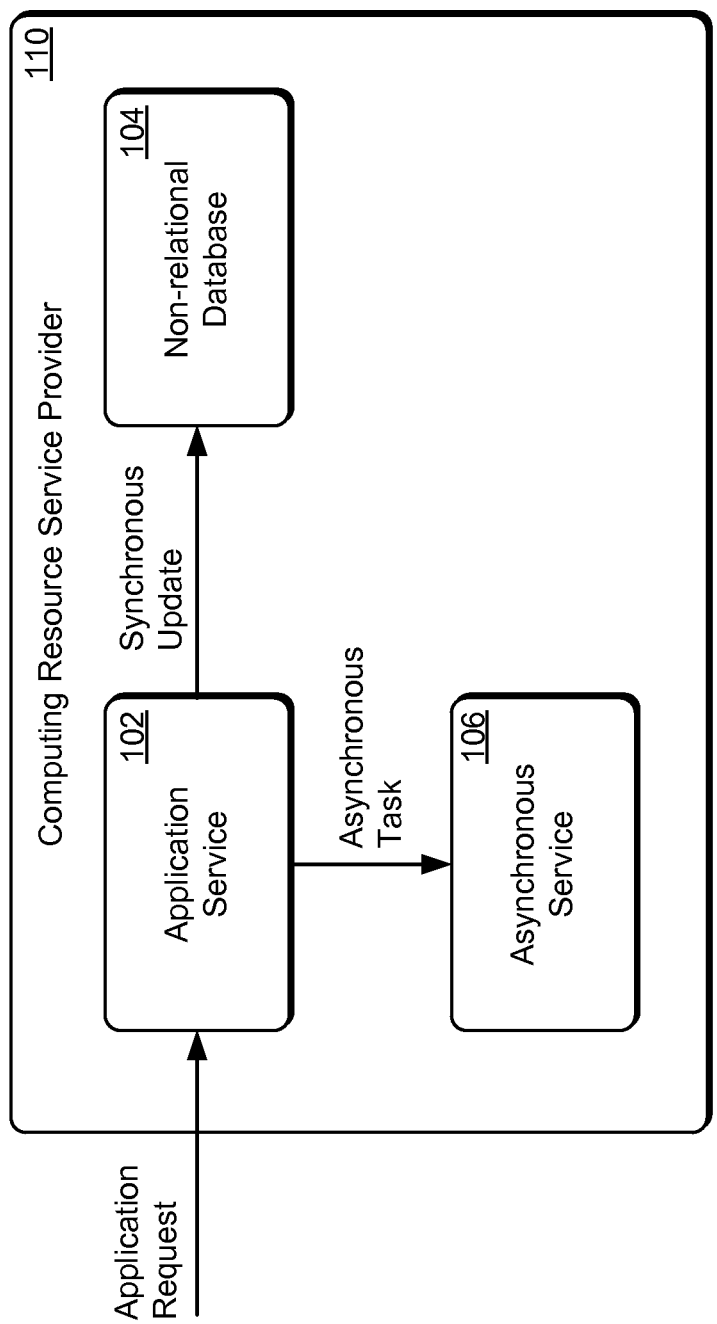
FIG. 1 shows an example of an environment for servicing application requests in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include initiating a first operation or first action, such as an atomic update to a non-relational database or data store, in response to or based at least in part on receiving a service request. The atomic update may be a write operation and may be initiated synchronously with receipt of the service request. Further, one or more remaining operations may be initiated based at least in part on receipt of the service request. Asynchronous workflows may be used for the execution of the one or more remaining actions. The asynchronous workflows may be associated with more computationally intensive operations than the first operation and may be launched to ensure overall system consistency.

A user device or a client application executed on the user device may make service requests to a document management system. The requests may be made using appropriately configured application programming interface (API) function calls and may specify actions to be taken, such as uploading a document, uploading a new version of an existing document, commenting on a document that is collaborated on with other users, annotating a document, deleting a document, changing user permissions or share modes with respect to a document, a group of documents or a folder that provides document views, among others.

The document management system may maintain a database that stores user or group privileges or permissions and share modes with respect to a document or a group of documents. In addition, the document management system may maintain other databases that, for example, include extracted document text to facilitate search functionality, among others. Upon receipt of a service request from a user, a plurality of actions may be required to be performed for the request to be processed. For example, the actions may include updating a permission database with new user permissions and extracting document text for inclusion in a database that enables search functions. In some embodiments, certain operations like updating a user permission database may require fewer computational resources than text extraction and the like. Further, it may not be desirable to perform all actions required for satisfaction of a request synchronously as that may results in long user wait times. Instead, it may be desirable for some operations to be performed synchronously while others (for example, more computationally intensive operations) to be performed asynchronously and achieve overall consistency. As described herein, an operation may be performed synchronously in relation to a request or response process. For example, in synchronous processing the result of an operation or indication of performance of the operation may be provided in a response but asynchronous processing may be performed before or after the response is dispatched. In asynchronous processing, it may not be required for a request or an action specified by the request to be processed or an execution to be finished or completed before a response is dispatched.

Upon receiving a service request, such as a request to upload a document, a document management system may cause an operation may be performed synchronously. In some embodiments, the operation may be writing a user permission for document access to a non-transactional or non-relational database to reserve the namespace. Further, because the database is non-transactional, only a single write operation to a single item in a single table may be guaranteed in various embodiments. One or more workflows may also be launched for executing other functions associated with the request. The workflows may be queued and an asynchronous service may be responsible for retrieving the workflows and causing their execution. The asynchronous service may utilize one or more computing engines for executing the workflows, which may include virtual computer systems or virtual computing instances that are executed utilizing a hypervisor on one or more physical hosts.

FIG. 1 shows an example of an environment for servicing application requests in accordance with at least one embodiment. An application service 102 of a computing resource service provider 210 receives an application request from a user device (not shown). The user device may be any type of computing device that is capable of communicating with the application service 102. The user device may belong to a user that is a member of an organization or group, whereby the organization or group may utilize the services of the application service 102 for a variety of purposes, such as uploading and sharing documents and collaborating on the documents, for example, by providing comments or feedback. Further, the computing resource service provider 210 may offer various functionalities for the management of documents. The computing resource service provider may, for example, enable the creation of folders for documents, searching document text or sending reminders to users to provide feedback or comments on documents.

The application request may require one or more operations or tasks to be performed for the request to be satisfied. The request may, for example, specify a document to be uploaded or specify one or more annotations or comments provided on a document, among others. The application service 102 may be tasked with ensuring that the received application request is processed and satisfied. As described herein, upon receiving the request, the application service 102 may initiate a synchronous update to a non-relational database 104. Further, the application 102 provides one or more asynchronous tasks to an asynchronous service 106. The asynchronous service 106 is task with performing the one or more asynchronous tasks.

Figure 2:
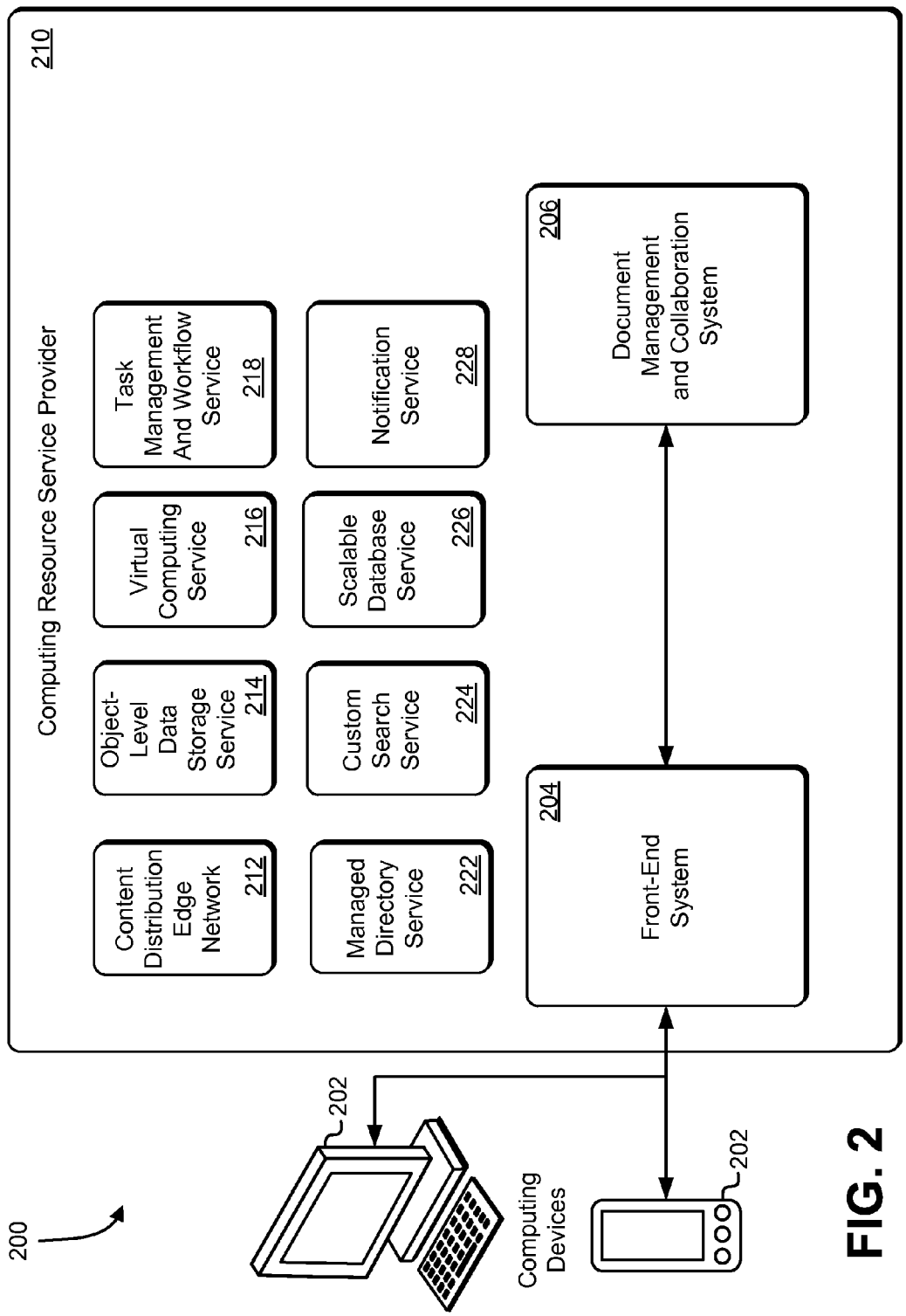
FIG. 2 shows an example of computing devices connected to a computing resource service provider in accordance with at least one embodiment.

FIG. 2 shows an example of computing devices connected to a computing resource service provider in accordance with at least one embodiment. The computing devices 202 may be any device that is capable of communicating with the computing resource service provider 210 or its entities. The computing devices 202 may also be equipped with local or remote (for example, network-based) computational and storage capabilities. The computational capabilities may be provided or enabled by a processor, such as a central processing unit (CPU), graphics processing unit (GPU), digital signal processor and the like. Examples of CPUs include CPUs that employ an x86 architecture (for example, as used in desktop and laptop computing devices) or a reduced instruction set computing (RISC) architecture (for example, as used in smartphone and tablet computing devices). The computing devices 202 may also be equipped with communications and networking hardware and may be capable of communicating using any communications protocol. Further, the computing devices 202 may be equipped with input/output devices that may include a display, a touch screen-based or keyboard-based input device or speakers. Additionally, the computing devices may include any type of memory, such as static or dynamic memory, and a power source or a power adapter. Aside from their hardware capability, the computing devices 202 may be configured to run or execute an operating system and/or other programs and the computing devices' 202 associated memory may store executable instructions that, when executed by one or more processor, cause one or more functions to be performed or cause the operating system and/or other programs to run. Although two devices are shown in FIG. 2, any number of devices may be contemplated in various embodiments. Further, the computing devices 202 may communicate with the computing resource service provider 210 or any entity of the computing resource service provider 210 via a network (not shown). The network may be public or private, whereby examples of the network include the Internet and an Internet service provider (ISP) network.

The computing devices 202 may collectively or individually be associated with a user or a customer of the computing resource service provider 210 or its entities and functions. The customer may be an organization that may utilize one or more of the services provided by the computing resource service provider 210 to maintain and deliver information to its employees, which may be located in various geographical locations. Additionally, the customer may be an individual that utilizes the services of the computing resource service provider 210 to deliver content to a working group located remotely.

The computing resource service provider 210 includes a front-end system 204 and a file management and collaboration system 206 as well as a plurality of services and systems as shown in FIG. 2. These include a content distribution edge network 212, an object-level data storage service 214, a virtual computing service 216, a task management and workflow service 218, a managed directory service 222, a custom search service 224, a scalable database service 226 and a notification service 228. It is noted that in various embodiments, the computing resource service provider 210 may include fewer services and systems than those described with references to FIG. 2 or may include additional or alternative services or systems to those described with reference to FIG. 2. Further, in alternative embodiments, the systems and services may be utilized outside the context of the computing resources service provider 210. For example, the services and systems may be stand-alone or used in conjunction described with systems and services other than those described with reference to FIG. 2.

The front-end system 204 may be a gateway to the file management and collaboration system 206 and may offer private and public services to user or customer and their computing devices 202. Access to the front end system 204 may require authorization or user authentication. In addition, a device or user privilege level may govern access to the front-end system 204 and any data exchanges between the front-end system 204 and the computing devices 202. Access to the front-end system 204 may be governed by a privilege level associated with a computing device 202 or a privilege level or credential given to the computing device 202 or a user of the computing device 202, for example, by a group or organization administrator.

The front-end system 204 may perform authentication of a customer, a user or a device before granting access to the resources of the file management and collaboration system 206. The authentication may be based on credentials, such as username and password information, or access tokens, among others. The front-end system 204 may provide services and interfaces that permit or enable customer access. For example, the front-end system 204 may enable a web-based platform or a console-based platform that provides information related to the services of the computing resource service provider 210 to the customer. Further, the front-end system 204 may enable the customer to execute applications or tasks in the computing resource service provider 210, track and manage the execution of the applications or tasks and receive the results of the execution and transmit the results to user devices. As further described herein, the front-end system 204 may be the gateway by which the customer or its associated devices 202 may utilize the plurality of services provided by the computing resource service provider 210.

The document management and collaboration system 206 enables and manages the execution and processing of documents for collaboration between one or more users in a distributed system. The document management and collaboration system 206 may, for example, enable uploading documents to the computing resource service provider 210 and retaining and modifying metadata associated with the documents. The document management and collaboration system 206 may further allow for search functions associated with the documents or their metadata as well as collaborations between users on the documents.

Although the term "document" is used herein to describe objects produced or collaborated on by users of the computing resource service provider 206, the term "document" is not limited to media, such as audio-visual media. A document may be computer files that are capable of being produced by or edited or viewed using a productivity program or suite. Accordingly, the document may be editable or non-editable text, images, drawings and websites, among others.

The content distribution edge network 212 of the computing resource service provider 210 may be a collection of computing devices and other resources collectively configured to deliver content, such as web content, to a plurality of users. The content distribution edge network 212 may have a plurality of edge locations, for example, that are distributed in world-wide locations that are strategically placed to optimize user data throughput and minimize latency. The content distribution edge network 212 may receive requests for content and deliver the requested content to users. The content distribution edge network 212 may interface with a storage service that stores a portion or all of the content and may cause the content to be retrieved and provided to a requesting party. The content distribution edge network 212 may be utilized to enable user-accessible websites or web applications of the front-end system 204.

The object-level data storage service 214 may be a collection of computing resources configured to synchronously process requests to store and/or access data. The object-level data storage service 214 may operate using computing resources (e.g., databases) that enable the object-level data storage service 214 to locate and retrieve data quickly, so as to allow data to be provided in response to requests for the data. For example, the object-level data storage service 214 may maintain stored data in a manner such that, when a request for a data object is retrieved, the data object can be provided (or streaming of the data object can be initiated) in a response to the request. As noted, data stored in the object-level data storage service 214 may be organized into data objects. The data objects may have arbitrary sizes except, perhaps, for certain constraints on size. Thus, the object-level data storage service 214 may store numerous data objects of varying sizes. As described herein, the object-level data storage service 214 may store any type of document (for example, document source files), underlays, previews, thumbnails, extracted document text, annotation indices or truth tables.

The virtual computing service 216 may be a collection of computing resources configured to instantiate virtual machine instances on behalf of an entity of the computing resource service provider 210 (such as the document management and collaboration system 206) or on behalf of a customer. A party may interact with the virtual computing service 216 (via appropriately configured and authenticated API calls) to provision and operate virtual computer systems that are instantiated on physical computing devices hosted and operated by the virtual computing service 216. The virtual computer systems may be used for various purposes, such as to operate as servers supporting a website, to operate business applications or, generally, to serve as computing power. Further, the virtual computer systems may be used to support database applications, electronic commerce applications, business applications and/or other applications. Although the virtual computing service 216 is shown in FIG. 2, any other computer system or computer system service may be utilized, such as a computer system or computer system service that does not employ virtualization or instantiation and instead provisions computing resources on dedicated or shared computers/servers and/or other physical devices.

The task management and workflow service 218 may be a collection of computing devices and other resources collectively configured to perform task coordination and management services that enable executing computing tasks across a plurality of computing environments and platforms. The task management and workflow service 218 tracks the progress of workflow execution and performs the dispatching and holding of tasks. Further, the task management and workflow service 218 may control the assignment of hosts or physical or virtual computing machines used for executing the tasks. A user may define a workflow for execution, whereby the workflow may include one or more tasks. The workflow may be defined using an application programming interface (API) configured function call to the task management and workflow service 218. Further, the user may specify task order for the workflow, conditional flows and timeout periods for restarting or terminating the execution of the workflow. In addition, execution loops for the workflow may be defined. As described herein, workflow execution may by asynchronous and may be preceded by synchronous execution of database writes.

The managed directory service 222 may be a collection of computing devices and other resources collectively configured to serve as a directory that enables users to log on to computing resources of the computing resource service provider 210 using one set of credentials and to enable administrators to uniformly apply security policies to the computing resource service provider 210. The managed directory service 222 may enable a web-based console for user and group management and may be used as an authentication system for user credentials.

The custom search service 224 may be a collection of computing devices and other resources collectively configured to permit customized searches of data sets and enable establishing security or authentication requirements on a party performing a search. Further, the custom search service 224 allows for data set replication to enable consistent performance in the case of outages. As described herein, the customer search service 224 may be utilized for maintaining a search index of customer documents and their associated metadata. Further, to ensure consistent performance the searchable metadata or customer documents may be replicated to ensure consistent performance and guard against outages.

The scalable database service 226 may be a collection of computing devices and other resources collectively configured to provide a structured storage system that facilitates the storage and retrieval of documents or data. The scalable database service 226 may be non-relational and may be based on a key-value model. Examples of the scalable database service 226 include a NoSQL database (for example, to be distinguished from a relational structured query language (SQL) database). The scalable database service 226 may be used to store metadata associated with documents or users. For example, the scalable database service 226 may store metadata for underlays, overlays, documents, feedback or comments. In addition, the scalable database service 226 may store metadata associated with users, organizations and permissions. As a non-relational database, the scalable database service 226 may guarantee atomic writes to a single item in a single table. Accordingly, a single write may be synchronously performed to a truth table and remaining writes may be performed asynchronously using workflows.

In the environment illustrated in FIG. 2, a notification service 228 is included. The notification service 228 may comprise a collection of computing resources collectively configured to provide a web service or other interface and browser-based management console. The management console can be used to configure topics for which customers seek to notify applications (or people), subscribe clients to the topics, publish messages, or configure delivery of the messages over clients' protocol of choice (i.e., hypertext transfer protocol (HTTP), e-mail and short message service (SMS), among others). The notification service 228 may provide notifications to clients using a "push" mechanism without the need to periodically check or "poll" for new information and updates. The notification service 228 may further be used for various purposes, such as monitoring applications that are being executed in the virtual computer system service 228, workflow systems, time-sensitive information updates, mobile applications, and many others.

Figure 3:
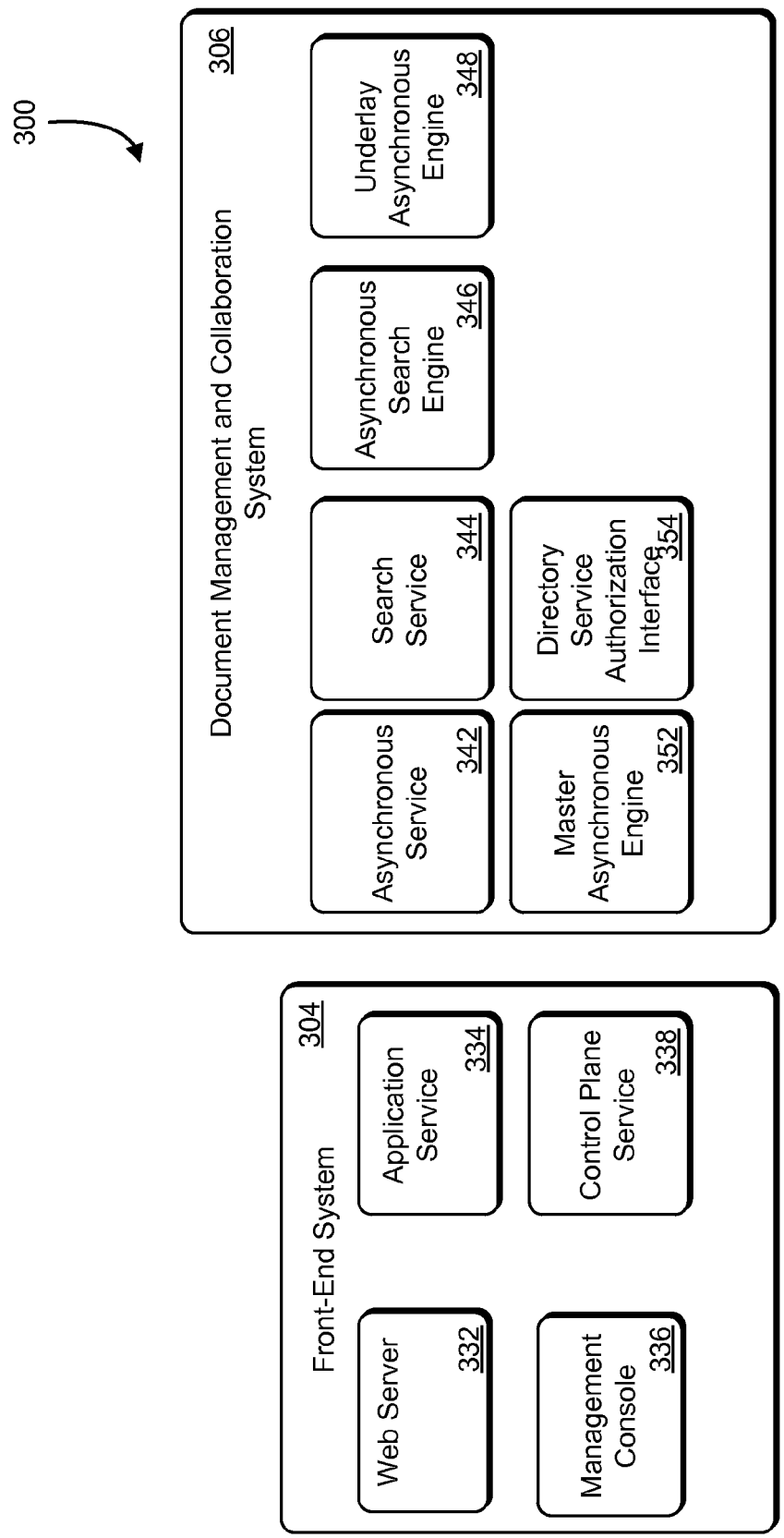
FIG. 3 shows the functional entities of the front-end system and the document management and collaboration system in accordance with at least one embodiment.

FIG. 3 shows the functional entities of the front-end system and the document management and collaboration system in accordance with at least one embodiment. The front-end system 304 includes a web server 332, an application service 334, a management console 336 and a control plane service 338. The web server 332 may enable the execution of a web site, a single-page web application or a single-page interface that permits a user to transmit or upload documents to the document management and collaboration system 306 and manage the documents. The web server may further enable the user to view and edit documents, underlays or overlays and provide commentary or feedback on the documents, underlays or overlays. The web server 332 may also enable an administrator or a user to set permissions or share modes that specify the privileges given to a user in accessing documents. In addition, the web server may enable users or devices to submit authentication or authorization credentials. The content distribution edge network, described with reference to numeral 212 in FIG. 2, may be used to distribute content of the web server 332. The actions performed by the user may be done via a website, an application or a management console and the web server 332 may enable executing the website, application or management console. Although one web server 332 is described with reference to FIG. 3, it may be contemplated that multiple web servers of any type may be used, whereby a portion of the web servers may be redundant.

The application service 334 may be a collection of computing devices and other resources collectively configured to serve as a user-exposed service that receives requests from the user and services the requests. A user request may be made using a website or a management console accessible to the user or a client that is executed on a user's device may make service requests on behalf of the user. The request may be an API function call and the application service 334 may process the request and manage its execution. The application service 334 may cause the synchronous execution of actions associated with a received request or alternatively may cause one or more actions that require more complex processing to be queued for asynchronous execution. The application service 334 may also be responsible for receiving user credentials and request authentication of the user from an authentication service. To cause the performance of operations requested by the user, the application service 334 may make one or more function calls to services or entities of the computing resource service provider 210. For example, the application service 334 may request user or access token validation from the managed directory service 222 or may cause search indices maintained by the customer search service 224 to be updated.

The management console 336 may be a collection of computing devices and other resources collectively configured to permit organizations, administrators and users to register for utilizing document management and collaboration services. The management console 336 may be used in addition or as an alternative to a website or an application running on a user device and may permit users and administrators to make service requests using appropriately configured API function calls. For example, the management console 336 may be used for inviting a user to join a document collaboration system and view and collaborate on documents. Further, the management console 336 may be used for allowing dashboard access, audit log access, permission setting (for example, for administrators and user), storage limit setting (for example, for organizations and users) and security setting (for example, password and encryption). The control plane service 338 of the front-end system 304 may be a collection of computing devices and other resources collectively configured to serve as an interface that enables creating new computing instances for document collaboration and management. Instances may be created by transparently creating a directory in the managed directory service 222 or associating an existing directory (for example, maintained by the managed directory service 222 or by a user or administrators) for document management and collaboration. The control plane service 338 may be utilized to create a document directory and the document directory may be executed and served by the managed directory service 222. The document directory may be associated with an organization having an administrator that is capable of providing permissions and privileges to users. Following the creation of the directory, the application service 334 may be used to enable functions affecting folders or documents of the directory.

The document management and collaboration system includes an asynchronous service 342, a search service 344, an asynchronous search service 346, an underlay asynchronous service 348, a master asynchronous engine 352 and a directory service authorization interface 354. The asynchronous service 342 may be a collection of computing devices and other resources collectively configured to manage the execution of asynchronous workflows. The asynchronous service 342 may include or be connected to a queue that stores asynchronous events for execution. The asynchronous service 342 may coordinate the execution of asynchronous workflows with the master asynchronous engine 352, which may be responsible for scheduling activities associated with the workflow. The activities may include underlay generation and text extraction. As described herein, the execution of workflow activities or tasks may be performed by engines or workers. For example, the asynchronous search engine 346 may be tasked with performing text extraction activities and the underlay asynchronous engine 348 may be tasked with performing activities associated with underlay creation.

In the course of executing asynchronous workflows, the asynchronous search engine 346 and the underlay asynchronous engine 348 may obtain or download documents or files from the object-level data storage service 214 and cause documents or files to be stored in the object-level data storage service 214. Further, the engines may generate documents of any file type based on received documents, perform text extraction and store annotations. In addition, the asynchronous search engine 346 may place search index updates associated with document in a queue for processing by the search service 344. The updates may be associated with search indices maintained by the custom search service 224 described with reference to FIG. 2 herein.

The search service 344 may be a collection of computing devices and other resources collectively configured to perform batch processing on the search index updates in the queue and launch a workflow for performing search index update activities. Upon launching the workflow, the asynchronous search engine 346 causes search indices to be updated in the custom search service 224. The directory service authorization interface 354 enables the document management and collaboration system 306 to delegate user authentication to another entity such the managed directory service described with reference to numeral 222 in FIG. 2. The document management and collaboration system 306 may submit user access tokens to the authenticating party via the directory service authorization interface 354 and may receive a response indicating whether a user may be authenticated.

As described herein, the scalable database service 226 may be a collection of computing devices and other resources collectively configured to store information or metadata associated with users (for example, user identifications and organizations to which the users belong) and information or metadata associated with documents and folders, such as a document identity or name, a folder identity or name, an association between a folder and a document or an association between a document and a document version, among others. In addition, the scalable database service 226 stores user or organization permissions for a document or folder. By way of example, a permission mode granted to a party may specify that a resource is owned by a party, a resource was shared directly with the party or a resource is nested within another resource that is shared with the party. In addition, the scalable database service 226 may store other information, such as document annotations or feedback, among others.

In various embodiments, the scalable database service 226 may be a non-relational database that stores hash-key values or hash-range values. The non-relational database may be advantageous in that it permits simpler horizontal scaling when compared to relational databases. Further, the scalable database service 226, as a non-relational database, may guarantee one atomic update to be performed in an operation. Accordingly, to guarantee that database updates or writes do not occur partially, only one update operation may be performed in an operation. As described herein, an atomic update may be an indivisible or irreducible update or an update that may only be performed wholly and cannot be performed partially.

Figure 4:
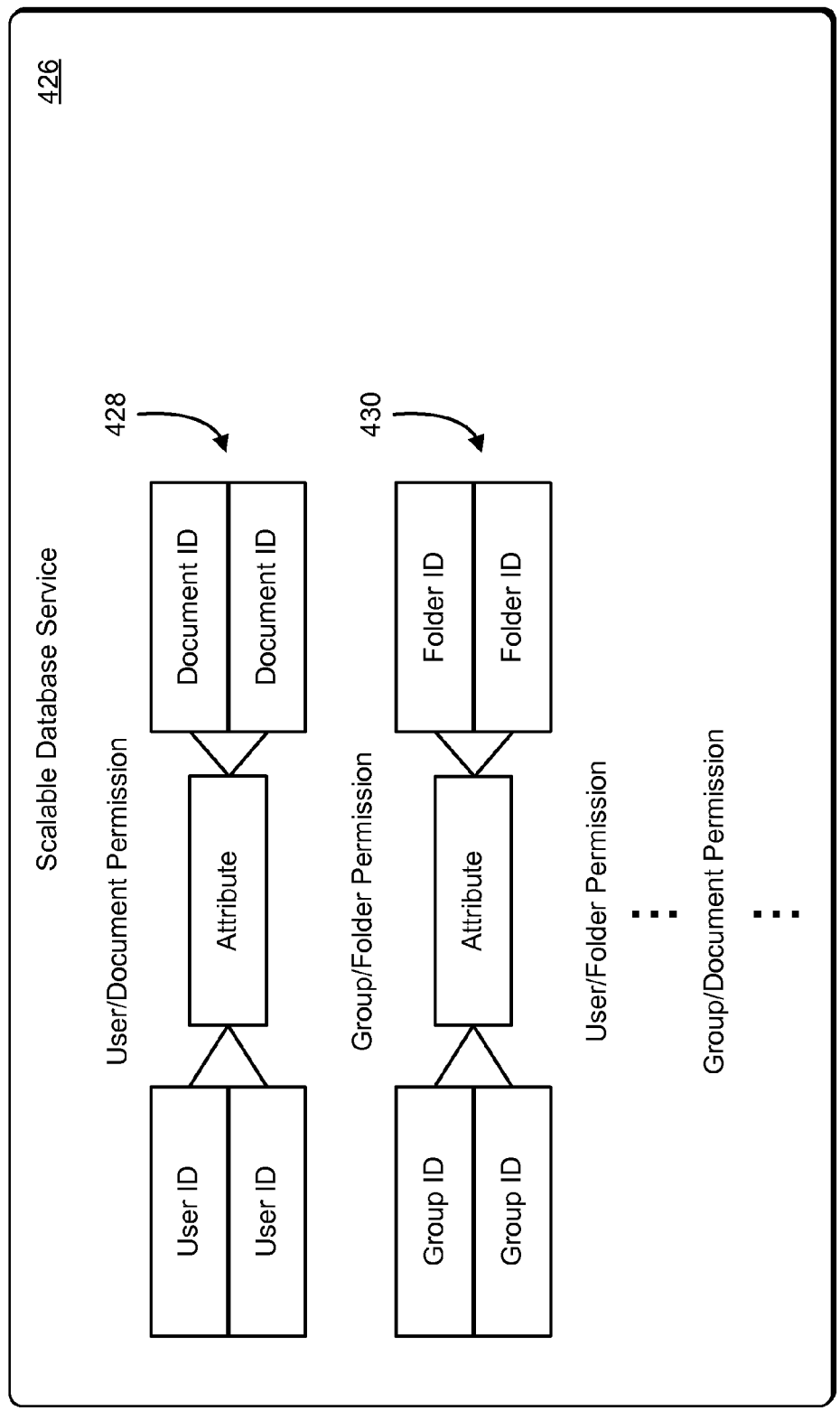
FIG. 4 shows a scalable database service for storing party permissions in accordance with at least one embodiment.

FIG. 4 shows a scalable database service for storing party permissions in accordance with at least one embodiment. The scalable database service 426 comprises a plurality of tables including, as shown in greater detail, a user/document permission table 428 and a group/folder permission table 430. The scalable database service 426 further includes a user/folder permission table and a group/document permission table. The tables of the scalable database service 426 are also referred to herein as truth tables.

As shown for the user/document permission table 428, a user ID, which may be a range key or a value key, is associated with a document ID, which may be a hash key. The association between the two identifies includes an attribute, which may described the permission type or the share type allocated to the user with respect to the document. The attribute may specify the type of permission granted to the user on the document and the share type with which permission is granted. For example, the share type may specify whether the document is owned by the user, whether the document is shared directly with the user or whether the document is nested within another resource that is shared with the user. Similarly, attribute values in the group/folder permission table 430 may specify other permission and share modes for a group with respect to a folder. For any one table of the scalable database service 428, in some embodiments, only one atomic update may be guaranteed per operation to a single item to a single table. Other updates, on the other hand, may not be guaranteed and may be done optimistically. In an optimistic update, it may be assumed that transactions or operations (for example, database updates) are in most cases not in conflict. Accordingly, neither data locking techniques or timestamp techniques may be required when performing an optimistic operation. An atomic update is also referred to herein as a truth table write. The truth table update may influence a permission model as described herein and its successful completion may serve as a basis for optimistic updates to information or metadata stored in the scalable database service 428. The optimistic updates may be performed using asynchronous workflows, whereby an asynchronous workflow may include mechanisms, such as failure detection and the retrial of failed operations that ensure an overall desired consistency. Scheduling an asynchronous workflow may be dependent at least in part on successful completion of a truth table as described herein.

Figure 5:
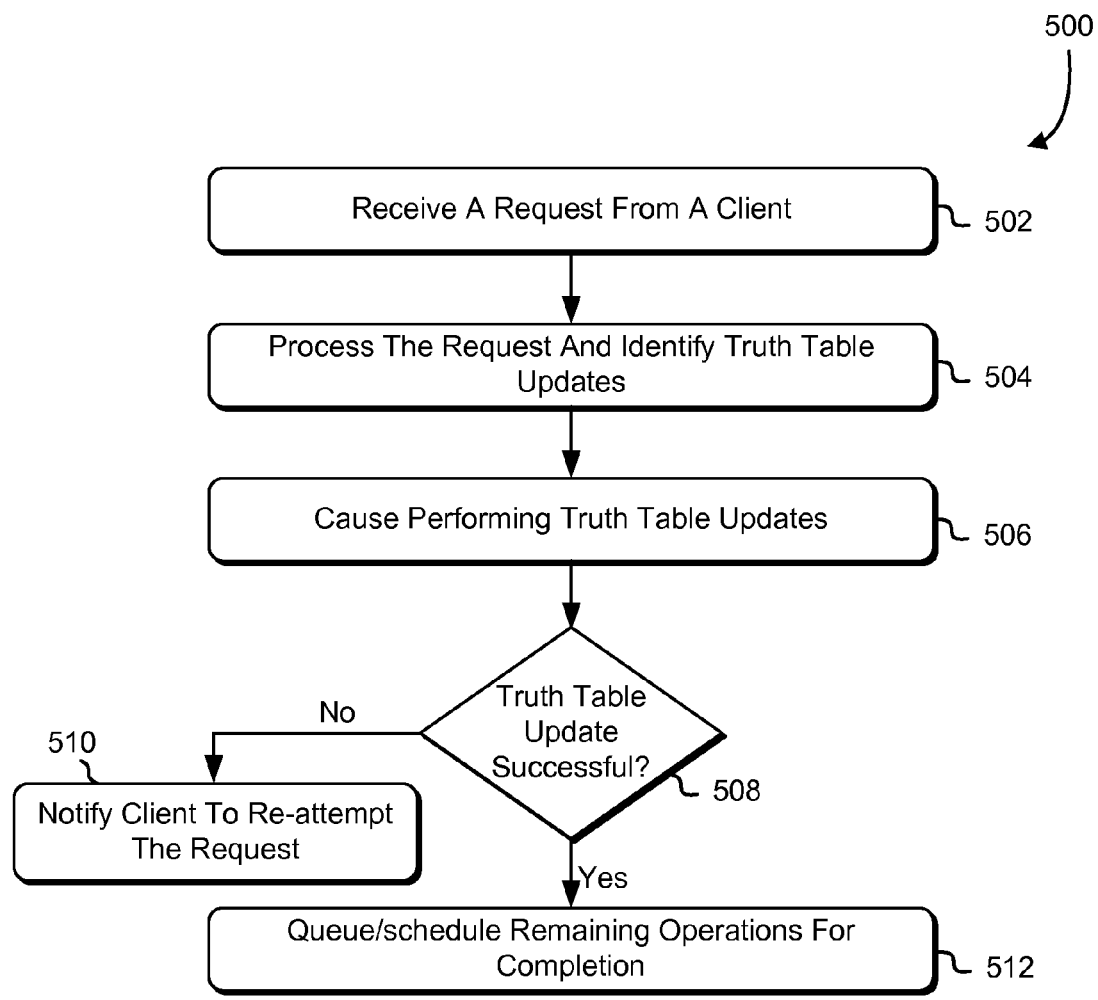
FIG. 5 shows an example of request processing in accordance with at least one embodiment.

FIG. 5 shows an example of request processing in accordance with at least one embodiment. In the process 500, an application service, such as application service 334 described with reference to FIG. 3, receives a request from a client. The request may specify one or more actions that are requested to be performed and the request may be an API function call, such as a representative state transfer (RESTful) web API. The application service may process the request and may identify 504 one or more truth table updates that are to be performed for satisfying the request. For example, the request may specify a document to be uploaded for a user and the application service may determine that a truth table update should be performed in order to associates the user with the document or an identity associated with the user with an identity associated with the document. Further, the request may specify adding the document to a folder or granting an organization access to the document and one or more truth tables may be updated in order to set the permission or share mode attribute of a user, group or organization in relation to a document, group of documents or folder.

The application service then causes 506 the truth table updates to be performed. Updating truth tables may be performed synchronously in relation to a received request or an API call from a client. Further, the application service may request the scalable database service to perform the updates, which may include writing to entries in the tables maintained by the scalable database service or creating one or more new entries in the tables. For example, if an incoming client request specifies that a document is to be shared with a user, a user/document permission table may be updated to reflect the sharing attributes. Further, the table may be updated to reflect new user permissions.

The application service or an entity associated with the application service then determines 508 whether the truth table update was successful. If a negative determination is made and if it is determined that the scalable database service was not successfully updates, the client is notified 510 to reattempt the request. Further, the client may also be notified that the request processing has failed. Additionally, in alternative embodiments, the application may reattempt performed a truth table update and the process may revert to numeral 506.

If, on the other hand, it is determined that the truth table update was successful, the application service queues/schedules 512 the remaining operations for completion. The remaining operations may be scheduled for completion asynchronously in relation to the received request from the client. Scheduling the operations may include placing the operations or a workflow representing the operations in queue, whereby the queue may be accessed by the asynchronous service 342 of the document management and collaboration system 306. The asynchronous service 342 may in turn launch one or more processing engines, such as the master asynchronous engine 352, the asynchronous search engine 346 or the underlay asynchronous engine 348, for executing the scheduled workflows.

Asynchronous workflows may be used to perform more computationally intensive operations than the truth table updates that are performed synchronously. For example, the asynchronous search engine 346 may extract text from documents and cause search indices in the custom search service to be updated in accordance with the extracted text. Further, an asynchronous engine may perform underlay and thumbnail generation and file conversion. Furthermore, an asynchronous workflow may be utilized to launch distributed computing or MapReduce computations of storage quotas or storing and analyzing usage metrics.

It is noted that a processing engine that is responsible for executing a workflow may utilize computational resources provided by a virtual machine executed by the virtual computing service 216. For example, one or more virtual machines or hosts of the virtual computing service 216 may be used to generate an underlay based at least in part on a document that is compatible with a standard productivity suite. It is also noted that following receipt of a user request (e.g., an API function call) and successful performance of synchronous operation, a response indicating successful processing may be sent to the user. The response may be a hypertext transfer protocol (HTTP) 2xx message and may be sent even if the asynchronous workflow awaits completion.

Figure 6:
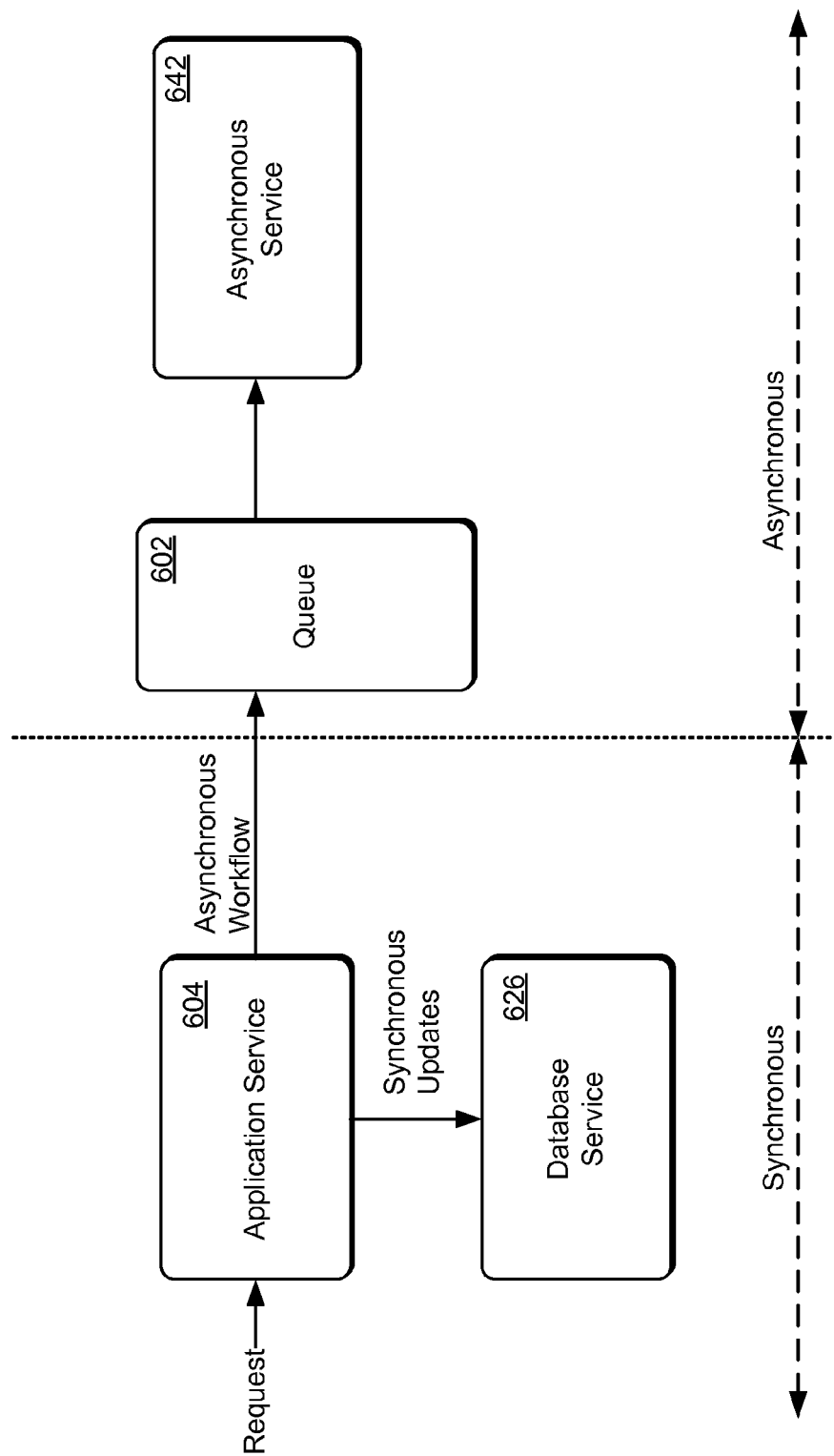
FIG. 6 shows a system for processing user requests in accordance with at least one embodiment.

FIG. 6 shows a system for processing user requests in accordance with at least one embodiment. The system includes an application service 604, a scalable database service 626, a queue 602 and an asynchronous service 642. The scalable database service 626 may be non-transactional and may only guarantee one atomic single table update and transactions across tables or within a single table may not be guaranteed. The system shown in FIG. 6 may be intended to make the non-transactional aspects of the system appear transactional to a user. Further, the system may minimize latency and optimize processing by causing certain actions to be performed synchronously in relation to a received request, whereas other tasks or functions (for example, more complex tasks) may be offloaded and performed asynchronously. An application service 604 receives a request from a user and the application service 604 determines that one or more actions are required to be performed due at least in part to the received request. The application service 604 may perform a portion of the actions synchronously, for example, by synchronously updating the scalable database service 626. The scalable database service 626 may be updated with user permissions or share rights associated with documents or folders. Further, the scalable database service 626 may be updated to reserve a namespace associated with a document. For example, if the request specifies that a document with a certain name by uploaded to the system, the application service 604 may seek to update the scalable database service 626 synchronously in order to reserve the name associated with the document. Other actions associated with the request may be performed asynchronously following the reservation of the name.

The application service 604 then generates one or more asynchronous workflows for performing actions associated with the received request. The application service 604 sends the asynchronous workflows to a queue 602 and the queue 602 retains the workflows for retrieval by the asynchronous service 642. The asynchronous workflows may include measures for ensuring consistency in the overall system. For example, the workflows may require failed operations to be retried and may impose time-outs on the execution of tasks. When the asynchronous service 642 becomes available for processing workflows, the asynchronous service 642 retrieves workflows from the queue 602 and causes the workflows to be executed, whereby one or more engines may be utilized by the asynchronous service 642 for processing the workflows.

Figure 7:
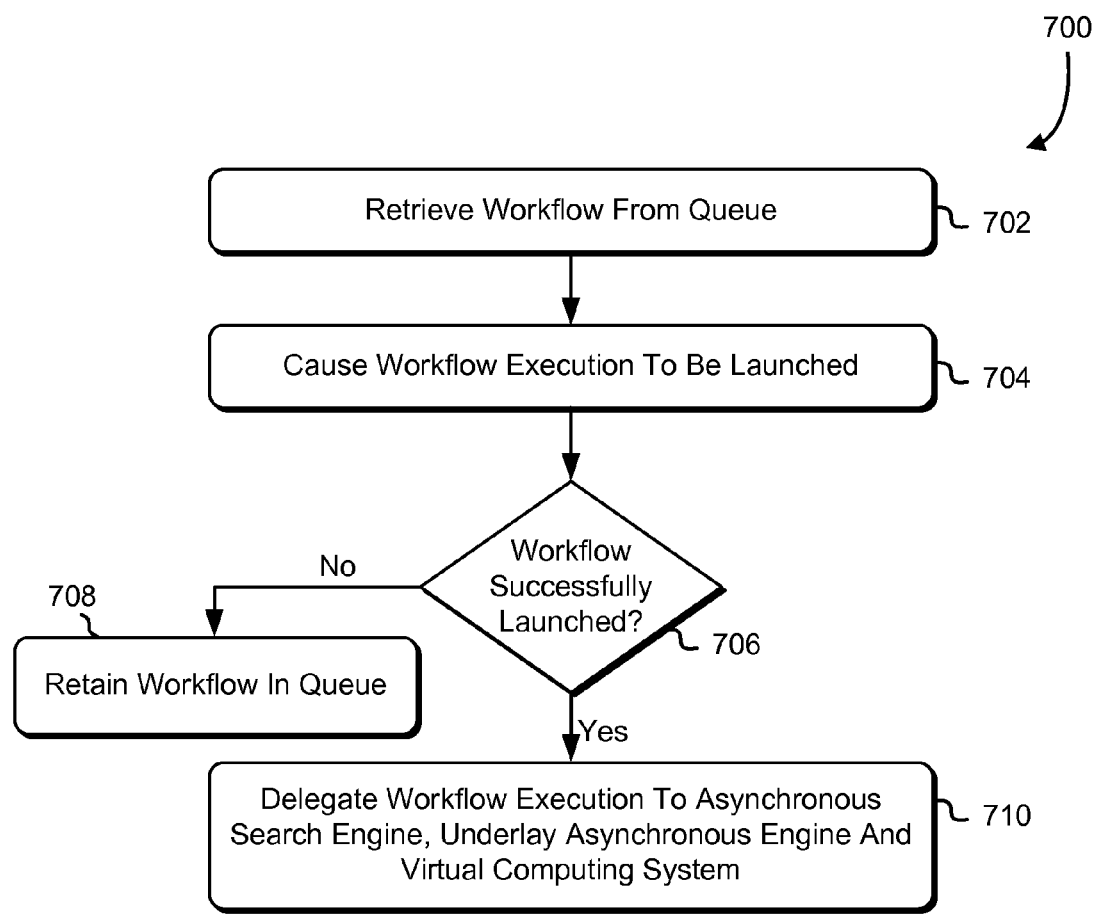
FIG. 7 shows an example of a method for executing asynchronous workflows in accordance with at least one embodiment.

FIG. 7 shows an example of a method for executing asynchronous workflows in accordance with at least one embodiment. In the process 700, the asynchronous service retrieves 702 a workflow from a queue. Following the retrieval of the workflow, the asynchronous service causes 704 workflow execution to be launched. As described herein, batch processing may be performed when executing workflows. A determination 706 is then made of whether workflow execution was successfully launched. If a negative determination is made, the asynchronous service retains 708 the workflow in queue. A workflow that is retained in the queue may not be deleted or de-queued and, instead, its execution may be launched at a later time.

If a positive determination is made and the workflow is determined to be successfully launched, the asynchronous service may delegate 710 workflow execution to the asynchronous search engine, the underlay asynchronous engine and the virtual computing system. For example, the asynchronous search engine may perform document text extraction. Further, the virtual computing system may be configured to instantiate computing instances that perform underlay generation for certain types of documents, such as those compliant with certain standard productivity suites, whereas the underlay asynchronous engine may be configured to generate underlay for other types of documents, such as images or websites. Before or after successful execution of the workflow, the workflow may be deleted or de-queued from the queue.

Figure 8:
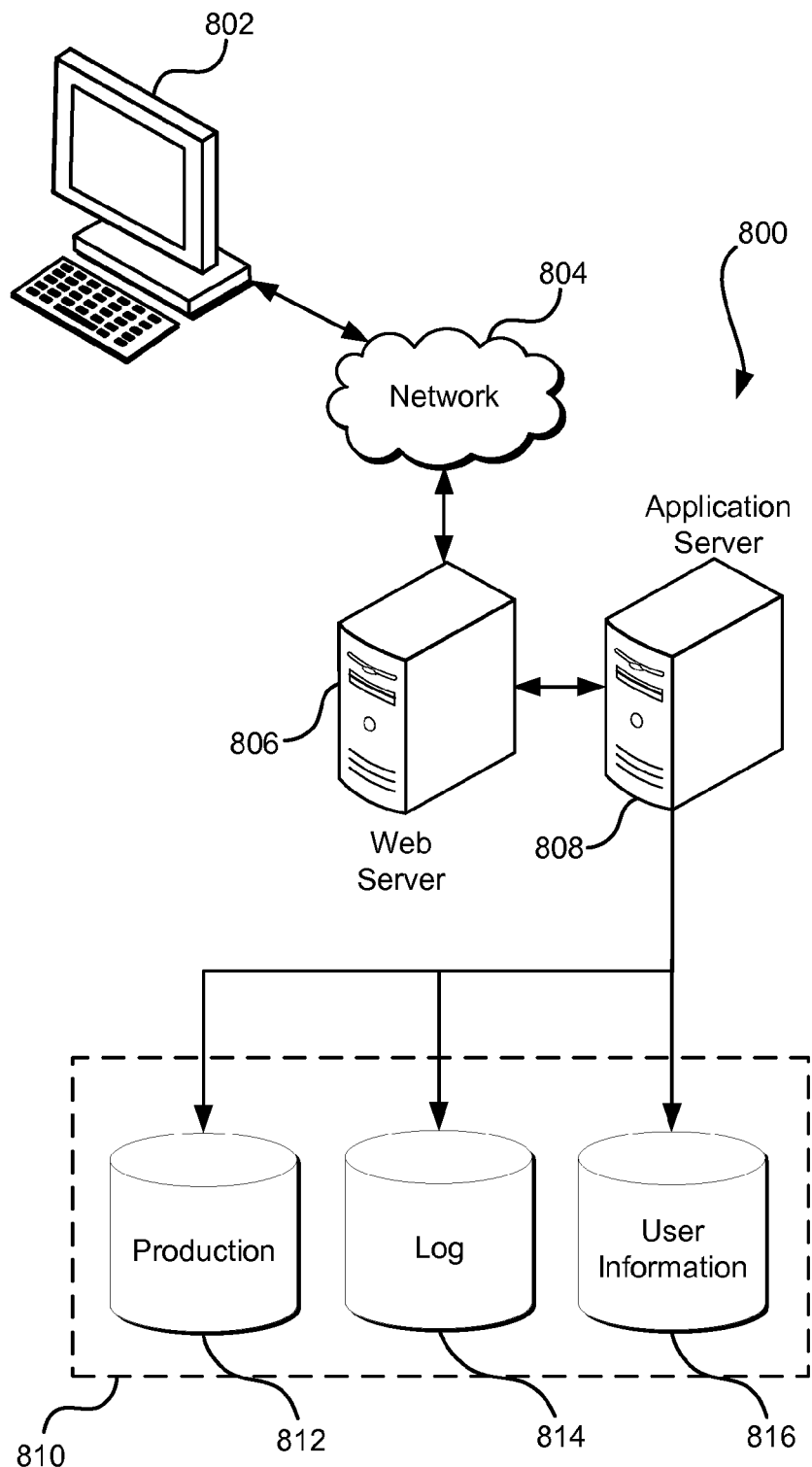
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for processing requests in a document management and collaboration system, the method comprising:
under the control of one or more computer systems configured with executable instructions,
receiving a request to upload a document to a document management service;
initiating an execution of a database write operation based at least in part on the received request, the execution of the database write operation being initiated to reserve a namespace for the document or set a user permission for accessing the document, the initiating being performed synchronously in relation to receiving the service request;
transmitting an indication of successful execution of the request based at least in part on the database write operation being successfully completed and despite one or more workflows awaiting successful completion;
provisioning the one or more workflows for generating an underlay associated with the document;
queuing the one or more workflows for execution, the one or more workflow being executed asynchronously in relation to receiving the request;
receiving a second request to access the document; and
in response to the second request, causing the generated underlay provided based at least in part on the reserved namespace for the document.

2. The computer-implemented method of claim 1, wherein:

the database write operation includes updating one or more truth table entries maintained by anon-relational database; and the one or more truth table entries specify at least one of a user permission for accessing the document, an association between the document and one or more folders or a namespace for a folder.

3. The computer-implemented method of claim 1, wherein the one or more workflows are provisioned to create or update one or more search indices associated with the document.

4. The computer-implemented method of claim 1, wherein the request is received from a user.

5. The computer-implemented method of claim 1, wherein the method further comprises, on a condition that the database write operation is not successfully completed:
sending, to a user, an indication of a failure to execute the request; and
reversing an outcome of the execution of the one or more workflows.

6. The computer-implemented method of claim 1, wherein a successful execution of the one or more workflows, together with successful execution of the database write operation, results in consistency of the document management service.

7. A system, comprising:
a document management system comprising:
one or more processors;
memory; and
an application service configured to:
receive a request associated with a document of the document management system, the request associated with a plurality of actions that are executed;
cause an execution of a first action of the plurality of actions to be initiated synchronously with receipt of the request, the first action being an update to a database of the document management system;
transmit an indication of successful execution of the request as a result of the execution of the first action and despite awaiting completion of one or more remaining actions of the plurality of actions; and
queue the one or more remaining actions of the plurality of actions; and
an asynchronous service configured to:
retrieve and cause the one or more remaining actions to be executed, the one or more remaining actions being capable of asynchronous execution and, when successfully executed together with the first action, resulting in consistency of the document management system.

8. The system of claim 7, wherein:
the database is a key-value store or a noSQL database; and
the update to the database includes writing a user permission or share mode for accessing a document, an association between the document and one or more folders or a namespace for a folder.

9. The system of claim 7, wherein the one or more remaining actions include creating or updating one or more search indices associated with the document.

10. The system of claim 7, wherein:
the request is received from a user; and
the application service is further configured to send to the user the indication.

11. The system of claim 7, wherein the application service is further configured to, on a condition that the first action is not successfully completed:
send, to a user, an indication of a failure to execute the request; and
reverse an outcome of the execution of the one or more remaining actions.

12. The system of claim 7, wherein the service request includes at least one of an instruction to create a folder, delete a folder, upload a document, share a document, delete a document, send a feedback reminder and send a storage quota communication.

13. The system of claim 7, wherein:
the one or more remaining actions are scheduled for execution using one or more workflows; and
the one or more workflows employ failure detection and retrial of failed operations for the consistency of the document management system.

14. A non-transitory computer-readable storage medium having collectively stored thereon executable instructions that, when executed by one or more processors of a computer system, cause the computer system to at least:
initiate synchronous execution of a first operation based at least in part on a received request, the received request pertaining to a document of a document management system that comprises the computer system;
provision one or more workflows for asynchronous execution based at least in part on the received request and the initiated execution of the first operation, the one or more workflows causing the performance of a set of actions satisfying a consistency requirement of the document management system; and
send an indication of satisfaction of the request on a condition that the first operation is successfully completed and despite the one or more workflows awaiting successful completion.

15. The non-transitory computer-readable storage medium of claim 14, wherein the instructions further comprise instructions that, when executed by the one or more processors, cause the computer system to, on a condition that the execution of the first operation is not successful, reverse an outcome of the execution of the one or more workflows.

16. The non-transitory computer-readable storage medium of claim 14, wherein the instructions that cause the computer system to initiate synchronous execution of a first operation further include instructions that cause the computer system to update one or more truth table entries maintained by a database.

17. The non-transitory computer-readable storage medium of claim 16, wherein the one or more truth table entries specify a user or a group permission for accessing one or more documents, an association between the document and one or more folders or a namespace for a folder.

18. The non-transitory computer-readable storage medium of claim 14, wherein the service request requests at least one of creating a folder, deleting a folder, uploading the document, sharing the document, deleting the document, sending a feedback reminder and sending a storage quota communication.

19. The non-transitory computer-readable storage medium of claim 14, wherein the instructions that cause the computer system to initiate synchronous execution of a first operation further include instructions that cause the computer system to initiate an atomic write operation to a non-relational database.

20. The non-transitory computer-readable storage medium of claim 14, wherein the instructions that cause the computer system to provision the one or more workflows for asynchronous execution further include instructions that cause the computer system to update one or more search indices associated with the document.

* * * * *